US009485724B2

(12) United States Patent
Lange et al.

(10) Patent No.: US 9,485,724 B2
(45) Date of Patent: Nov. 1, 2016

(54) METHOD AND DEVICE FOR SPATIOTEMPORAL CONTROL OF ELECTRICAL ENERGY CONSUMPTION OF A TELECOMMUNICATIONS NETWORK DEPENDENT ON CONDITIONS IN THE ENERGY SUPPLY SYSTEM

(71) Applicant: DEUTSCHE TELEKOM AG, Bonn (DE)

(72) Inventors: Christoph Lange, Berlin (DE); Heiko Lehmann, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/419,956

(22) PCT Filed: Aug. 2, 2013

(86) PCT No.: PCT/EP2013/066260
§ 371 (c)(1),
(2) Date: Feb. 6, 2015

(87) PCT Pub. No.: WO2014/023654
PCT Pub. Date: Feb. 13, 2014

(65) Prior Publication Data
US 2015/0237574 A1 Aug. 20, 2015

(30) Foreign Application Priority Data
Aug. 9, 2012 (DE) ........................ 10 2012 107 346

(51) Int. Cl.
*H04W 52/02* (2009.01)
*H04W 24/04* (2009.01)
(Continued)

(52) U.S. Cl.
CPC .......... *H04W 52/0203* (2013.01); *G05B 15/02* (2013.01); *G05F 1/66* (2013.01); *H04W 24/04* (2013.01)

(58) Field of Classification Search
CPC .......... H04W 52/0203; H04W 52/02; H04W 52/0261; Y02B 60/40–60/46
See application file for complete search history.

(56) References Cited

U.S. PATENT DOCUMENTS 5,017,799 A    5/1991  Fishman
2008/0106425 A1  5/2008  Deaver et al.
(Continued)

FOREIGN PATENT DOCUMENTS

DE    102012107346 B4   5/2014
WO    WO 2014023654 A1  2/2014

OTHER PUBLICATIONS

Fraunhofer IZM, Fraunhofer ISI, „Abschätzung des Energiebedarfs der weiteren Entwicklung der Informationsgesellschaft, Bearbeitungsnummer I D 4-02 08 15-43/08, Abschlussbericht an das Bundesministerium für Wirtschaft and Technologie, Berlin, Karlsruhe, Mar. 2009.

*Primary Examiner* — Paul H Masur
*Assistant Examiner* — Kabir Jahangir
(74) *Attorney, Agent, or Firm* — Leydig, Voit & Mayer, Ltd.

(57) ABSTRACT

A method for spatiotemporal control of electrical energy consumption of a telecommunications network dependent on conditions in a power grid that is responsible for supplying the telecommunications network in space and time, includes detection of an overload on a power grid due to too high power supply by exchanging of information between the power grid monitoring unit and the telecommunications control unit, and an increase in power consumption by the telecommunications network in the spatial area, through configuration of the telecommunications network components in this spatial area by the power grid monitoring unit for the period of too high power supply.

18 Claims, 3 Drawing Sheets

(51) Int. Cl.
*G05F 1/66* (2006.01)
*G05B 15/02* (2006.01)

(56) References Cited

U.S. PATENT DOCUMENTS

| | | |
|---|---|---|
| 2010/0102936 A1 | 4/2010 | White et al. |
| 2010/0145534 A1 | 6/2010 | Forbes, Jr. et al. |
| 2010/0145540 A1 | 6/2010 | McKenna |
| 2010/0284287 A1 | 11/2010 | Venuto |
| 2011/0015801 A1 | 1/2011 | Mazzarella |
| 2011/0302431 A1 | 12/2011 | Diab et al. |
| 2012/0029714 A1 | 2/2012 | Brian et al. |
| 2013/0086404 A1* | 4/2013 | Sankar .................. G06F 1/305 713/324 |
| 2015/0237574 A1 | 8/2015 | Lange et al. |

* cited by examiner

Normal operation of
telecommunications network

"Emergency" operation of telecommunications
network in a region

● fully active network node (full power
uptake)
— active connection

○ partially deactivated network node (reduced
power uptake)
--- deactivated connection

METHOD AND DEVICE FOR SPATIOTEMPORAL CONTROL OF ELECTRICAL ENERGY CONSUMPTION OF A TELECOMMUNICATIONS NETWORK DEPENDENT ON CONDITIONS IN THE ENERGY SUPPLY SYSTEM

CROSS-REFERENCE TO RELATED APPLICATIONS

This application is a U.S. National Phase application under 35 U.S.C. §371 of International Application No. PCT/EP2013/066260, filed on Aug. 2, 2013, and claims benefit to German Patent Application No. DE 10 2012 107 346.5, filed on Aug. 9, 2012. The International Application was published in German on Feb. 13, 2014 as WO 2014/023654 under PCT Article 21(2).

FIELD

The present invention relates generally to the fields of telecommunications and energy supply. In particular, the invention relates to the control of electrical energy consumption of a distributed telecommunications system with a plurality of controllable elements. In detail, the invention comprises a method and a device for spatiotemporal control of electrical energy consumption of a telecommunications network dependent on the conditions in a power grid or, more precisely, energy supply grid, which is responsible for supplying the telecommunications network in space and in time, the power grid having a central power grid monitoring unit, which monitors the operating condition of at least a part of the components in the power grid, and the telecommunications network having a telecommunications control unit, which controls at least a part of the telecommunications network components in the telecommunications network.

BACKGROUND

The energy consumption by systems in information and telecommunications technology is currently rising substantially throughout the world. The background to this development is the substantial increase in internet applications in two dimensions: firstly, the internet is being accessed by an ever-growing number of users. The term 'user' also includes automated users such as remote-controlled production or sensor systems. Secondly, applications are increasing both their bandwidth requirement in data transport between different spatially-separated components and also the requirement for automated calculations. All the growth phenomena mentioned generate a proportional growth in the energy volume consumed by telecommunications networks if one assumes that the networks are expanded in line with demand according to today's architecture and system engineering paradigms. In 2007, ICT-related energy consumption at 55.4 TWh was already 10.5% of the total energy consumption in Germany. Without counter-measures, an increase of more than 20% to approximately 66.7 TWh is expected by the year 2020 [1].

Systemically modified framework conditions apply to the procurement of this energy according to the programming decisions of the German Federal Government in the summer of 2011 ("Energy Transition" [2]). In particular, the inclusion of renewable energy suppliers such as solar and wind energy in system-relevant orders of magnitude (in 2011 approximately 20% share of power supply and approximately 12% of total end energy consumption, thus including heat and mobility [3]), will potentially lead to fluctuations in availability and price risks. Consequently, qualitatively new processes such as energy storage and load displacement must be implemented and controlled on an industrial scale.

SUMMARY

In an embodiment, the invention provides a method for spatiotemporal control of electrical energy consumption of a telecommunications network dependent on conditions in a power grid that is responsible for supplying the telecommunications network in space and time, the power grid having a central power grid monitoring unit, which monitors the operating condition of at least a part of the components in the power grid, and the telecommunications network having a telecommunications control unit, which controls at least a part of the telecommunications network components in the telecommunications network, the power grid monitoring unit and the telecommunications control unit being connected to each other via a network in order to exchange digital information, comprising the following steps: detection of an overload on the power grid due to too high power supply by exchanging of information between the power grid monitoring unit and the telecommunications control unit, increase in power consumption by the telecommunications network in the spatial area, through configuration of the telecommunications network components in this spatial area by the power grid monitoring unit for the period of too high power supply.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
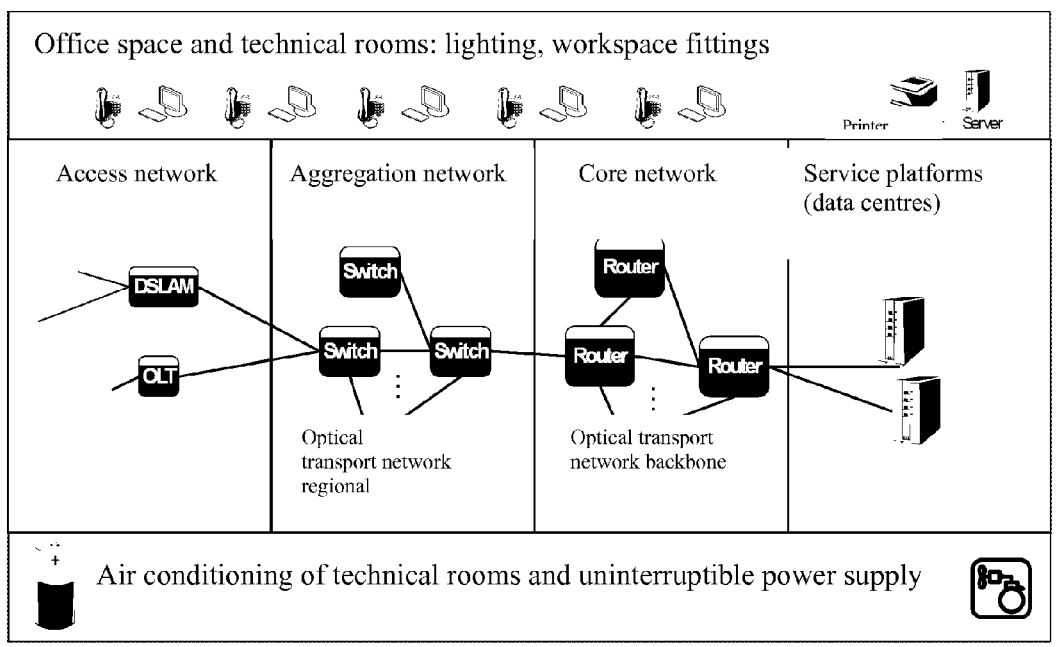
FIG. 1 Principle arrangement of a telecommunications network with typical consumers (network technology, offices and technical rooms, air conditioning of business premises and systems for uninterruptible power supply)

The method and arrangement according to the present description of the invention provides a mechanism for controlling a large consumer of electrical energy—namely the telecommunications network—in spatial and temporal degrees of freedom.

In total, telecommunications networks represent relatively large electrical loads, which moreover are distributed over large geographical areas, e.g. over the area of a country. In addition to the actual network engineering, the operation of such networks requires technical rooms and offices and other supporting functions—for example, air conditioning for the technical rooms—which themselves have their own energy consumption. Within the meaning of the description of the invention presented here, all these energy requirements are subsumed in the energy consumption of the telecommunications network.

The term telecommunications network is understood to mean the connection of terminals so that information can be exchanged between them.

Examples of telecommunications networks are a telephone network and a computer network, IP network.

In this arrangement, the connections between the terminals can be wired or wireless. Different network topologies are differentiated depending on the type of connection. However, different topologies can also be used within a network: In the telephone network, the subscriber premises are connected in star formation to the local exchanges but the latter are connected to each other via a partially meshed network. Digital and analogue information can be transmitted via these connections. This information can, if necessary, be modulated up to higher frequencies. Digital information can be coded with a line code. In this arrangement, the components that are used in addition to the terminals can be of various types, from the base station, registers, switches, routers, gateways, converters through to exchanges, servers, etc. This list is only by way of example; depending on the technology, a plurality of different components can be used.

Depending on importance, these components are built redundantly with back-up system and can be operated in different operating modes. Thus, redundant components can be switched on and off, the operating speed can be adjusted, the transmission speed and number of active components can be determined, i.e. switching on and off of processors and components that are abundantly available. In addition, UPSs (uninterruptible power supplies) can be switched on and off so that operation can occur without power grid supply. All these components and their modified operation influence the power consumption and energy requirement. The machines can be controlled centrally, particularly also regionally.

In addition, telecommunications networks contain energy storage elements (integral part of UPS systems), which are used to guarantee reliable network operation even if the energy supply briefly fails: The energy storage elements at telecommunications network sites are used according to the prior art expressly to ensure an uninterruptible voltage supply to the elements of the telecommunications network.

The energy requirement of a conventional telecommunications network is constant if an actual stage of expansion of the network is considered at a fixed point in time: telecommunications networks are dimensioned in their capacity so that they can cover an expected peak traffic demand, in addition to a reserve. This network capacity is then permanently available and determines the energy requirement of the network. This behaviour is determined firstly by the hardware features of the network elements and secondly by the current network operational and control system paradigms. In contrast, actual traffic demands in telecommunications networks fluctuate to some extent very substantially—depending on the network section under consideration, for example, see [4], [5]. These traffic fluctuations can be observed in daily cycles or in weekly and seasonal rhythms. In summary, the traffic volume in telecommunications networks to be transmitted and processed is predicted to substantially increase [6], based on the growth factors mentioned in the introduction.

FIG. 1 shows schematically the principle components of a telecommunications network, which, according to a conventional system, contribute jointly to energy consumption, particularly with the energy storage elements and the air conditioning plants. The energy supply for the telecommunications network must be adapted to the system characteristics as they arise through the Energy Transition. In this context, physical properties must be distinguished from regulatory provisions. The first category includes:

The volume of decentralised infeed energy from renewable sources is constantly increasing. In this case, the natural fluctuation in supply (duration of sunshine, wind strengths) makes it more difficult to plan the total supply. Large-scale balancing effects have been theoretically proven but are based on an infrastructure that will not be available in the medium term.

Decentralised infeed leads to a reversed load flow, particularly in the low voltage network but increasingly also at higher network levels. The wide fluctuation range in energy flows thus results in a dimensioning dilemma for line expansion—should expansion concentrate on peak loads with high CAPEX input (capital expenditures) or on mean values with optimum investment?

In addition to dimensioning issues for future expansion, the decentralised infeed into the existing low-voltage networks leads to acute network stability problems, e.g. relating to maintaining frequency and to providing reactive power.

These physical properties can be similarly expected in all national supply systems that convert to renewable energy suppliers. However, important legally stipulated properties are national specifics and cannot simply be transferred. In particular, the following facts apply in this case:

The role model in the energy market governs responsibilities and prototype contractual relationships between the individual market participants. In principle, a distinction is made between a market sector that is competitively organised and a regulated sector in which the regulator's stipulations apply.

The alternating relationship between regulated transmission functions and competitively organised generation is particularly problematic here.

The defined method models, for example, for prioritising infeeding, schedule notification of a balancing group or of making balancing power available have thus been aimed at strengthening stability and predictability in the total system. However, this succeeds only to the extent that the physical factors are correctly represented.

A telecommunications network which has controllable energy consumption sites, storage and generation capacities with blanket coverage in all sectors of the entire supply system and overall accounts for significant shares of the total national power consumption is predestined in a particular way to take on an active role in the configuration of the system characteristics mentioned.

In addition, there are power grids or, more precisely, energy supply grid, which represent the integrated grid for supplying the consumers with electrical energy through energy supply companies. In order to supply the consumers with electrical energy, lines are required from the power generators (power stations and wind farms) to the consumers. Power grids with varying specified voltages are used for this purpose; frequencies are also specified for alternating current. In this case, there are power generators with generators, substations, transformers and distribution stations. There are often regional sectors of integrated grids that are supplied with electricity from one or more power stations. The grids are high-voltage, medium-voltage and low-voltage grids, the latter usually being operated at 230-400 V, to supply households. The high-voltage grids are usually operated at 110 kV. In order to supply the consumers with electrical energy, lines are required from the power generators (power stations and wind farms) to the consumers. Power grids with varying specified voltages are used for this purpose; frequencies are also specified for alternating current. The majority of components are monitored, checked and controlled by the system operator. This is usually done on a regional basis but it can also be on a state (Land) scale. This allows for power stations outside the grid to be switched on in the event of a bottleneck. Excess energy can also be released. If, for example, a large volume of wind energy or solar energy is available, it can be passed on to neighbouring grids. It is also feasible that generators are switched off when there is an overload. Thus, the system operators share the information, which can also be viewed on a regional basis. Thus, with the provision of digital data transmission, they can find out about the utilised capacity or overload of a power station or even any damage to it. In this case, a region is considered to be a spatial area that is supplied with energy predominantly from the local energy generators. Usually, energy is not transmitted over large distances. Thus, these are areas in the range of 10-400 km, or German federal states; naturally, a power grid operator's area might thereby be covered.

The invention is achieved by a method for spatiotemporal control system of electrical energy consumption of a telecommunications network dependent on the conditions in a power grid, which is responsible for supplying the telecommunications network in space and in time, the power grid having a central power grid monitoring unit, which monitors the operating condition of at least a part of the components in the power grid, and the telecommunications network having a telecommunications control unit, which controls at least a part of the telecommunications network components in the telecommunications network. It should be noted that the terminals in a telecommunications network such as mobile terminals or PCs and routers of the end users often cannot be controlled directly through the telecommunications control unit by system operators because there is no access. However, indirect control can occur whereby nodes, to which this equipment is connected, reduce their capacity and transmission rate, which also contributes to a reduction in power consumption in the customer's terminal, because the equipment has to run at lower frequencies and lower speed when processing the data. Direct control usually occurs in the backbone area in which exchanges, routers, switches, base station and other high-performance systems are arranged, which transport large amounts of data for a plurality of subscribers. These components often have a plurality of processors in order to undertake parallel data processing, which increases the speed. These devices also have internal clock rates, through which the chips are clocked in these devices, which in turn determines the processing speed. Such devices can usually be power-controlled, which leads to a low throughput, also reducing power consumption.

The power grid monitoring unit and telecommunications control unit are connected to each other via a network in order to exchange digital information.

The method in the present invention comprises the following steps: detection of an overload in the power grid through too low a power supply in a spatial area, through exchange of information between the power grid monitoring unit and the telecommunications control unit, reduction of power consumption of the telecommunications network in the spatial area, through configuration of the telecommunications network components in this spatial area by the power grid monitoring unit for the period of low power supply; and/or detection of an overload in the power grid through too high a power supply, through exchange of information between the power grid monitoring unit and the telecommunications control unit, increase in power consumption of the telecommunications network in the spatial area, through configuration of the telecommunications network components in this spatial area by the power grid monitoring unit for the period of too high power supply.

In a preferred embodiment of the method in which a reduction in the power consumption of the telecommunications network components is intended to be achieved, one or more of the following configurations can be implemented:

Disconnection of the telecommunications network components from the power grid and operation through a UPS, uninterruptible power supply. Due to the fact that a plurality of components in the telecommunications network is safeguarded by a UPS, the energy can be used to briefly relieve the power grid. Such a relief leads to the battery being discharged whereby the network is not used. In an alternative embodiment, even with a large route ahead, the energy can be used to feed back directly into the power grid if this does not compromise the operation of the telecommunications network.

Changing a routing of communications information in order for the communications information to bypass the spatial area. This enables large data streams, which are normally fed through the spatial area, to bypass this area. Particularly with packet-oriented networks, which are usually redundantly built, such a change in routing can be achieved very rapidly by adapting a few routers so that the data traffic can be quickly re-routed thus leading to a sustained reduction in data traffic. It should be noted that connection-oriented networks also provide such possibilities. Through reducing data traffic, the transmission speeds of the individual components within the area are usually also reduced without thereby substantially causing a reduction in quality of data traffic.

Switching off redundant components in the telecommunications network components in the spatial area. As has already been explained above, the network components often have redundant components such as network connections, processors, working memory, etc., which are used either to provide higher processing speeds or to provide redundancy in the case of a fault. Naturally, the two components can be switched off to require less energy in the short-term.

Reducing transmission speeds in the telecommunications network components in the spatial area. This approach has also already been discussed above whereby a reduction in transmission speed data can be achieved by transmitting a lower number of bits per second. This leads to substantially less processing time and to slower operation of the individual network components, leading to a saving.

In a further embodiment, feeding in alternative energies, for example, from wind farms or solar plants, can create a surplus in the energy network. It may be advisable in such a situation to activate additional components which are particularly energy-hungry. Thus, it is also conceivable that specific tasks, which are particularly energy-intensive, are carried out during this period. Such tasks are, for example, backing up voluminous data that are not time-critical. The distribution of data such as, for example, multimedia data are possible approaches that fall into this period. Consideration can also be given to maintenance works that possess a particularly high energy consumption such as, for example, testing UPS systems with re-charging of UPS batteries. An increase in power consumption by the telecommunications network components can be achieved through one or more of the following configurations:

Switching on IPSs in order to fully charge them. For example, it is conceivable that specific UPSs are installed which are then charged up if there is a high energy supply.

Changing a routing of communications information in order to guide the communications information through the spatial area;

Switching on redundant components in the telecommunications network components in the spatial area to increase throughput;

Increasing transmission speeds in the telecommunications network components in the spatial domain to increase throughput;

Activation of reactive loads.

In a further possible embodiment, the configuration is dependent on a temporal overload, the temporal overload being predicted by a forecast module in order to predict the overload situation in order thereby to introduce the configuration in good time. This forecast module can use statistical analysis data and models that are known in the prior art. If a specific pattern occurs, preparatory measures can then be introduced to control the components appropriately. In particular, weather data can also be incorporated, from which it can be seen whether an excess supply of energy is to be expected from abundant sunshine or strong winds. In addition, in a possible embodiment the forecast module can determine the spatial area in the same way as the time duration and extent of a possible overload situation. It should be noted that an overload situation exists both when too much energy is provided and when too little energy is provided. Both situations can be critical for a power network.

In a further embodiment, the operating parameters both of the telecommunications network and the power grid are recorded as a function of place x and time t by the power grid monitoring unit and/or the telecommunications control unit in order to undertake detection based on this function.

In a further embodiment, the output power, power quality parameters such as frequency, phase angle and, optionally, others are recorded by the power grid monitoring unit in order to enable detection.

In a further embodiment, further configurations are undertaken in a control circuit in the case of overload until an overload no longer exists, or the telecommunications network can no longer be operated. In this way, it is possible to check whether the measures taken were sufficient to accommodate the overload. If this was not successful, further steps can be introduced. Thus, a gradual progression in the steps is conceivable. Through a feedback approach, these steps and configurations can then in turn show how much energy can be saved if specific configurations have been undertaken. It is thus possible to classify the configurations by recording their saving potential and the speed of implementation. Further aspects can demonstrate the long-term nature of the configurations. Activating a UPS is usually only a short-term configuration, which leads to the power grid being relieved within a timeframe of minutes to a few hours. A sustained relief cannot be achieved in this way. In contrast, reducing the transmission speed or, more precisely, the bandwidth usually leads to a longer-term and sustained reduction in power consumption. Depending on the forecast and the situation, appropriate steps and configurations can be introduced.

In a further approach, a check is made before implementing the configuration whether the overload can be sufficiently prevented by changing the configuration and, if this is not the case, no new configuration is undertaken. This has the advantage that, in the case of emergency, the UPS components can still be fully used.

A further part of the invention is system comprising a telecommunications control unit for spatiotemporal control of electrical energy consumption of a telecommunications network depending on the conditions in a power grid that is responsible for supplying the telecommunications network in space and in time, the power grid having a central power grid monitoring unit, which monitors the operating condition of at least a part of the components in the power grid, the telecommunications control unit being configured to control at least a part of the telecommunications network components in the telecommunications network, the power grid monitoring unit and the telecommunications control unit being connected to each other via a network in order to exchange digital information, the system being configured to enable a reduction in power consumption of the telecommunications network in the spatial area to be controlled by configuration of the telecommunications network components in this spatial area for the period of low power supply in the event of detection of an overload in the power grid through too low a supply in a spatial area, through exchange of information between the power grid monitoring unit and the telecommunications control unit; and/or to enable an increase in power consumption of the telecommunications network in the spatial area to be controlled whereby, by configuration of the telecommunications network components in this spatial area for the period of too high power supply, the network components consume more energy in the event of detection of an overload in the power grid through too high a power supply, through exchange of information between the power grid monitoring unit and the telecommunications control unit.

A decisive advantage that the invention offers in terms of the smart grid is the coordinated control of a network-type defined consumer with integrated storage capacities. The network-type structure of consumption enables the selection of the hierarchical level on which a load displacement or a storage service is defined. In principle, this can change between a "microscopic" level—the level of the end consumer, in approximate terms, detached houses—and a "macroscopic" level—provided perhaps by a balancing group or a control area. It should be noted here that instabilities at a low hierarchical level can sometimes be removed with little effort (for example, intermediate buffering of photovoltaic infeed power still in low voltage range), while the repair work increases considerably if such instabilities are passed on to higher network levels. A feature of the invention is a central control system that permits this hierarchically resolved freedom of action. This is listed by way of example in the following table.

| Reference level | Example mechanism | Service provider address | Control system behaviour |
|---|---|---|---|
| Low voltage level | Intermediate buffering of non-predictable infeed power of renewable energy companies | Distribution system operators (DSO) | A DSO diagnosis system triggers the allocation of locally identified storage resources via an interface. |
| Medium voltage level | Critical load conditions in network areas can be stabilised by the telecommunications equipment being supplied via the internal storage facilities for a specific time duration or additional network technology being switched off. | Distribution system operators (DSO), balancing group - coordinator | The DSO diagnosis system indicates the spatial cross-section and the amplitude of the critical load via an interface. Control system determines the spatiotemporal dimensions of the potential load shedding and appropriately adjusts the storage control system and, optionally, the control system of the network technology. |
| High-voltage level | Resources from network load shedding and storage capacities are interconnected into a virtual balancing power station which is available to the TSO for providing balancing power. | Transmission system operator (TSO) | The provision of balancing power demands precisely defined prequalifications, which are indicated in the control system. The precisely defined normal case schedule is also stored in the control system. |

The provision of balancing power is subdivided into the responsibility of the transmission system operator (TSO) and into a cascade of primary, secondary and tertiary balancing. The secondary balancing is studied by way of example: positive or negative power provision occurs in the timeframe between 15 minutes and one hour after commencement of the normal case depending on the deviation from actual demand and logged-on schedule. In this context, the reference value is the control area (Germany has four control areas). The interconnection of all reference values integrated into the telecommunications network (charging or discharging UPS systems, switching on or off users), said values being located in the control area concerned, produces overall a balancing power that can be made available to the TSO. The organisational framework for this is comprised of the method described in the invention and the arrangement.

A technical distinguishing feature of the invention consists in the control system architecture, which permits the selective interconnection and control of the total distributed ensemble of controllable consumers and storage units in space and in time resolved into different use scenarios. For this purpose, the control system contains a monitoring module, a forecast module and an optimisation algorithm. In addition, the optimisation algorithm can be configured via parameters so that a priority control system can be set a priori for the different use scenarios.

The following is a description of the operating principle of the invention.

Figure 2:
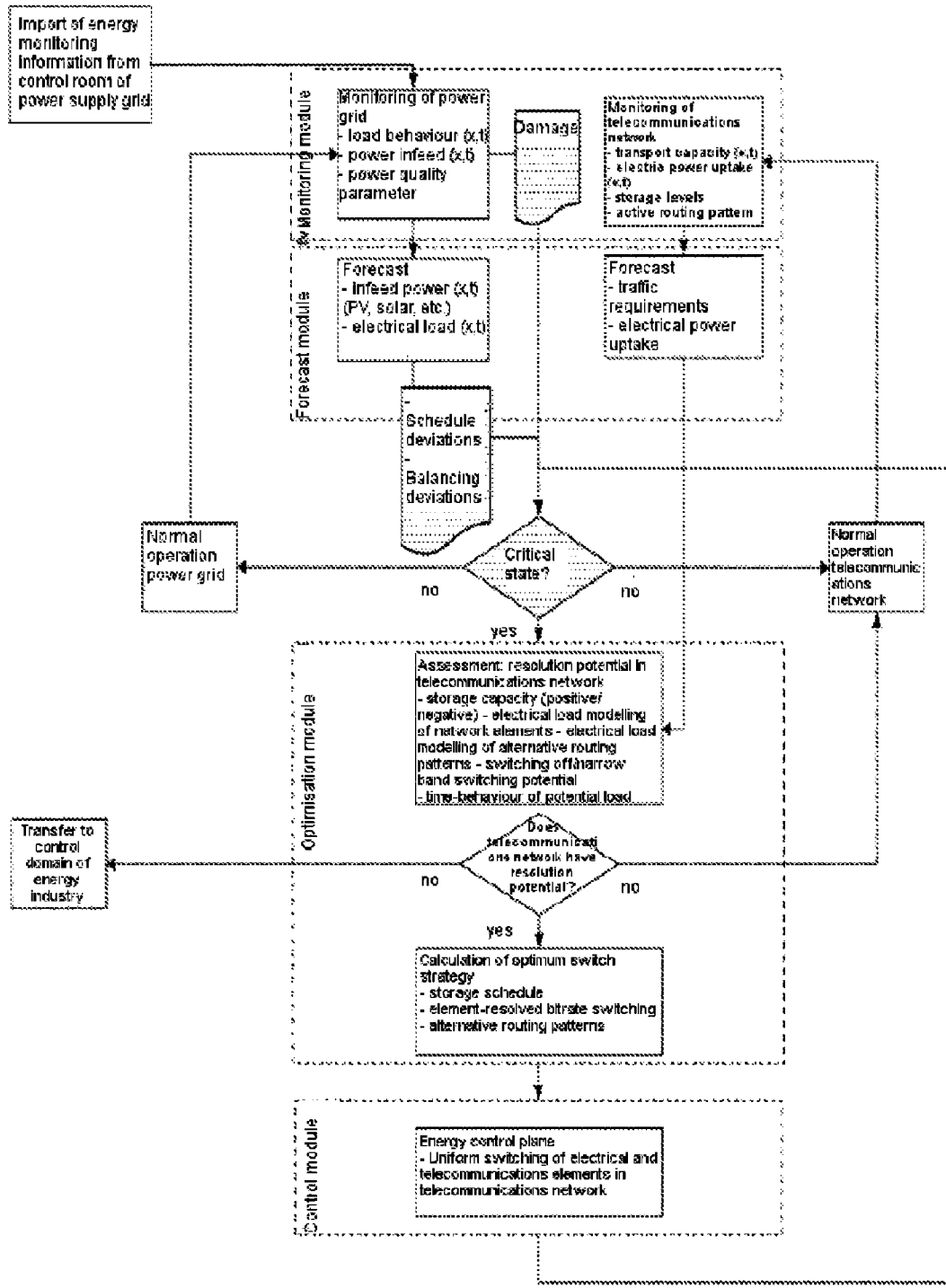
FIG. 2 Schematic operating principle of control arrangement according to the present invention FIG. 3 Switching the network topology from a normal operating mode to an "emergency" operating mode in a region that is affected by a bottleneck in energy supply

FIG. 2 shows schematically the operating principle of the control system according to the present invention; this will now be described in detail and illustrated with embodiment examples.

A part of the present invention is a uniform, global control system for bandwidth production in the telecommunications network, the management of energy storage in the telecommunications network and the energy consumption of the telecommunications network from the supply grid of the energy grid operator. The control system contains the following modules having the further described features:

Monitoring module: The monitoring module records both the operating states in the telecommunications network, with regard to traffic and bandwidth demands and the power consumption in a load-adaptive operating grid associated with it, and the states with regards to generated and available energy volumes in the energy supply grid. In the telecommunications network, the traffic can be measured at crucial points in the network. For example, traffic demands and associated power consumption can also be recorded and stored in (future) grid elements—such mechanisms are currently being standardised.

Monitoring in the power grid is common practice in the energy supply grid. At suitable points in the grid, mostly at the higher aggregated voltage levels, power, reactive power, current flows, phase angle and frequency are measured (over and under-oscillations in the grid frequency are becoming increasingly important to the stability characterisation of the grid). A divergence in demand and supply is expressed as a frequency drift.

Forecast module: The forecast module predicts data traffic demands resolved by time and place, power consumption and demands associated with that in the telecommunications network and also the available energy volumes from power generation in the energy supply grid. Here, it is particularly important to consider different timescales, which can range from a few milliseconds (switching on and off telecommunications network resources) to days (power volumes and energy prices). Based on the available historical information (traffic volumes, energy requirements, energy prices, etc.), the future behaviour is predicted using statistical methods. A further important component in the forecast is the weather-dependent supply forecast for the availability of renewable energies (wind and solar), which is produced in the form of a weather report (simulation calculation based on measured values). Accordingly, the forecast module combines statistical analyses with current measured values and a simulation system.

Optimisation module (algorithm model for control system): The optimisation core of the control system can optimise the coupled systems of telecommunications network and energy supply grid according to different cost functions. Examples of this are:
Minimisation of $CO_2$ emissions
Business optimisation for the telecommunications network operator
Business optimisation for the energy supply companies, particularly favourable provision of reserve energy
Optimisation with regard to stability of the energy supply grid
Economic optimisation for the telecommunications network operator (here: independence from energy imports)

Control module: The control module controls the individual network components in telecommunications network and energy supply grid according to the optimisation result by the algorithm optimisation method. It consists of a central entity, which can influence the local entities through suitable protocols and interfaces. Special controller architecture must be implemented for local controlling of storage elements that are designed as UPS systems.

In particular, the decision-making in both the telecommunications network and in the energy supply grid proceeds hierarchically according to the different network levels. The monitoring module supplies a spatial extent of the detected disruption. The forecast module states the probable behaviour of this disruption in space and time. The optimisation module checks the possible influences that are available to the electrical elements of the telecommunications network and then decides on the optimum reaction. In this context, as described above, it is vital that the lowest possible network level is used: A critical drop or rise in voltage in a branch of a star-shaped distribution network, for example, is absorbed if possible by a single UPS system in this branch itself. If such a system is not available, the next higher hierarchy level is selected and an action initiated.

The method according to FIG. 2 is as follows: The monitoring module records operating parameters both of the telecommunications network and the energy supply grid as a function of place x and time t. In this case, operating parameters are the infeed power, the load behaviour (output power), power quality parameters (such as, for example, frequency, phase angle, etc.) and further suitable parameters. In addition, external information is included from the control room of the energy supplier. Operating parameters are likewise recorded for the telecommunications network. These are the transmission power (the bitrate and bandwidth, the electrical power consumption, energy storage levels, activated routing patterns and further suitable reference values, in each case as a function of place x and time t. On the basis of statistical algorithms, each assigned forecast module predicts the described operating parameters resolved according to x and t. A component according to the suggested method checks cyclically whether a critical state has been reached in the energy supply grid: this can be both an event that the monitoring or forecast module identifies and, for example, damage. The algorithms used consist of a combination of deterministic equations (known as equations of motion) and empirically found probable continuations of measured states without knowledge of the driving forces. Input variables of equations of motion are, for instance, the calculated curve of data traffic intensities in the telecommunications network, the availability forecast of renewable energy companies, the statistically most probable development of electrical load (based on the logged-in schedules from the balancing group managers). These driving parameters permit the further development of a minimal disruption to be mathematically calculated. In contrast, an empirical method carries forward into the future a detected state based on the statistical method. The algorithms used combine both approaches. Damage here means an event having an external influence on the grid (e.g. through bad weather, natural disaster, etc.) and thus cannot be predicted by the forecast module. If no critical state is identified, then both energy supply grid and telecommunications network remain in normal operating mode. However, if a critical state is identified or predicted with the aid of the forecast module algorithms, then the optimisation module first assesses the solution potential available through including the telecommunications network. In doing so, the energy storage states are analysed, alternative routing patterns are calculated and assessed, and the potential offered by narrow bandwidth telecommunications network operation or a partial switching off is also computed. It is important here to include the timescales: the potential of the telecommunications network to solve a critical state depends on its time duration. If the potential of the telecommunications network is assessed as insufficient for the present critical state, then the telecommunications network remains in normal operation and remedying the problem is passed on to the control area of the energy industry.

If, on the other hand, the potential of the telecommunications network is assessed as sufficient to remedy the critical state, the telecommunications network is configured accordingly: examples are reconfiguration of the routing pattern, element-resolved bitrate switching, etc. With element-resolved bitrate switching, the reconfiguration is not network-wide; instead, only one network element, for example, is switched to a low-power mode—or one network element and the associated remote switch (e.g. in the case of DSL). So the whole network is not reconfigured. It is different with the reconfiguration of the routing pattern; there, a large number of nodes are optionally affected and configured so that traffic is re-routed round a certain node, for example, which must not be used at that time (as described above).

The energy control plane of the control module then takes over the actual switching of the telecommunications network elements to the required appropriate mode (bitrate, routing pattern).

This optimisation is continued for so long until the critical state no longer exists—or the solution potential of the telecommunications network is insufficient, and then it has to be passed on to the control area of the energy industry.

Some scenarios are described below.

Scenario 1: Medium-term operation of the telecommunications network with reduced capacity to reduce its energy requirement in a defined energy supply area.

In this embodiment or application, the following scenario is considered: if a power plant unit, for example, fails in a control area, lowering the power consumption of the telecommunications network—within certain limits—can avoid having to switch on expensive and inefficient back-up power stations. So, if, in a limited geographical area, there is less electrical power available in the energy supply grid than is normally required at that time, it is possible to stabilise the energy supply grid in that the electrical consumption of the telecommunications network is reduced in that it is switched to a mode with reduced bandwidth—which leads to a corresponding decrease in power consumption in a load-adaptive (and, in the best-case scenario, power-proportional) operating telecommunications network. The forecast module provides an estimate of the spatial and temporal failure penetration range of the drop in power. The optimisation core compares these data with the addressable load shedding potential and produces a switching proposal that implements the optimum solution. This also contains the re-routing of telecommunications traffic out of the affected area as a further degree of freedom of load shedding. Thus, a switch is made from normal broadband operation to narrow band operation with lower and spatially displaced power consumption: for a limited time, power can initially be taken from the telecommunications network's own energy storage facilities so that no power has to be taken from the energy supply grid during this time determined by the battery capacity. If, after this time, the disruption still exists, power can again be taken from the energy supply grid in narrow band operation, which is still significantly less than the power used in broadband operation. When full capacity is restored to the energy supply grid, then—normal—broadband operation is resumed in the telecommunications network.

Figure 3:
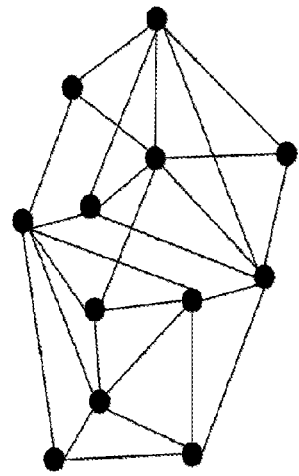
Figure 3:
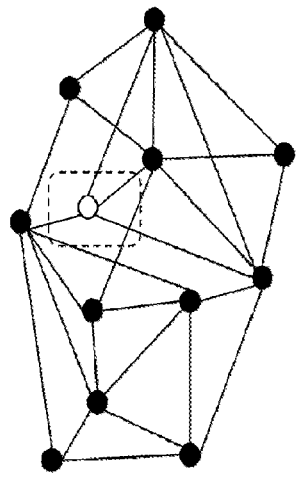

FIG. 3 shows a special application in which the routing is included in an—interconnected—network as a degree of freedom within the meaning of the above representation: in the left part of the diagram, the network is shown in normal operation where all nodes and connections are working at full (normal) capacity and power consumption. On the right side of the diagram the same network is represented with a shortage of energy supply in the marked region: now all connections—except for one remaining—to the network node concerned are deactivated and the node has its capacity—and power consumption—run down to the extent that it only has to process traffic requests that arise in its directly allocated supply region or that have their destination there. All other traffic, e.g. transit traffic, that would also run via this node in normal operation are despatched via alternative paths in the network so that the energy requirement in this region can be reduced to stabilise the energy supply grid.

Scenario 2: Short-term peak-load clipping in a distribution grid.

This example assumes a substantially lower failure penetration range in space and time than in Scenario 1. Here, the controllability of the electrical power consumption of the telecommunications network is made available to the distribution system operator without interfering in the control area-related procedures for back-up energy provision. The short duration of the disruption, which is identified by the forecast module, results in the response from the optimisation module complementing a possible switch in telecommunications to narrow band with further actions. Depending on the level of the schedule deviation, a decision can be made to feed back into the local supply grid from the electrical energy storage facilities of the UPS system. In this case, the storage facilities have to supply the electrical systems of the telecommunications network as well as feed back an amount of electrical power to be defined into the local distribution grid. This is obviously only possible within a limited time period and places particular demands on the local controller architecture. Therefore, the time course has to be constantly examined by the monitoring, forecast and optimisation module to see whether handling the disturbance can remain limited to the distribution grid level or whether back-up energy procurement across the control area has to be initiated. This would mean the transition to Scenario 1, for which however the storage-based short-term components for load shedding would no longer now be available.

Scenario 3: Supercritical decentralised infeed into distribution grids.

An object of this scenario is to manage decentrally infeed renewable energies. This only becomes a problem or disruption if the spatiotemporal forecast of photovoltaic ally-generated or wind energy underlying the schedule calculation deviates substantially from the reality. Due to the complex character of weather systems, such forecasting errors are to be expected even in the future. In the case of extreme upward deviation in infeed, there is a risk of instability—particularly for the distribution network (wind energy is usually fed into higher voltage grid levels). Moreover, if a distribution network has a topology with a low degree of interconnection, this instability risk is intensified. In such a case with its own forecast module (which works on a shorter timescale than the above-mentioned weather forecast), the present invention would analyse the instability risk for the distribution network resolved in space and time. The optimisation algorithm then calculates the optimum actions for the available elements—these include local intermediate storage of electrical energy or, for example, providing reactive power. The control module then implements these actions at the element level. It should be noted that intermediate storage requires that storage capacities are available. The success of a short-term action therefore depends on the medium-term control system regime, which is to be developed jointly with the stakeholders in energy supply from statistical and economic analyses.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES AND SOURCES

[1] Fraunhofer Institute for Reliability and Micro integration (IZM); Fraunhofer Institute for Systems and Innovation Research (ISI): *Abschätzung des Energiebedarfs der weiteren Entwicklung der Informationsgesellschaft* [Appraisal of the energy requirement for further development of the information society]. Final report to the German Federal Ministry for Economic Affairs and Energy: Berlin, Karlsruhe, March 2009

[2] The Federal Government of the Federal Republic of Germany: http://www.bundesregierung.de/Content/DE/Artikel/2 011/0 6/2 011-06-06-energiewende-kabinett-weitere-informationen.html

[3] German Federal Ministry for the Environment, Nature Conservation and Nuclear Safety, press release no. 170/11, 29, Dec. 2011, http://www.erneuerbare-energien.de/pressemitteilungen/aktuelle_pressemitteilungen/pm/4 8231.php

[4] http://www.de-cix.net/about/statistics/

[5] v. Eimeren, B.; Frees, B. (2010). Fast 50 Millionen Deutsche online—Multimedia für alle?" [Almost 50 million Germans online—multimedia for all?] Media Perspektiven, 7-8, 33 4-349. [Online, March 2012]. Accessible: http://www.ard-zdf-onlineStudie.de/fileadmin/Online10/07-0 8-2 010_van_Eimeren.pdf

[6] Cisco Visual Networking Index: *Forecast and Methodology*, 2010-2015. [Online, March 2012] Accessible: http://www.cisco.com/en/US/Solutions/collateral/ns341/ns525/ns5 37/ns705/ns827/white_paper_cl 1-48136 0_ns82 7_Networking_Solutions_White_Paper.html

The invention claimed is:

1. A method for spatiotemporal control of electrical energy consumption of a telecommunications network dependent on conditions in a power grid for supplying power to the telecommunications network, the power grid having a central power grid monitoring unit that monitors an operating condition of at least one component connected to the power grid, the telecommunications network having a telecommunications control unit that controls at least one telecommunications network component of the telecommunications network, wherein the method comprises the following steps:
  detecting an overload in a spatial area of the power grid by exchanging of information between the central power grid monitoring unit and the telecommunications control unit; and
  decreasing power consumption by the telecommunications network in the spatial area corresponding to the overload through configuration of at least one telecommunications network component in the spatial area corresponding to the overload to reroute communications to go around the spatial area corresponding to the overload for a time period corresponding to the overload.

2. The method according to claim 1, wherein decreasing the power consumption by the telecommunications network in the spatial area corresponding to the overload further comprises one or more of the following:
  disconnecting telecommunications network components from the power grid and operating the disconnected telecommunications network components through an uninterruptible power supply (UPS);
  feeding UPS energy into the power grid;
  switching off redundant components of the telecommunications network in the spatial area corresponding to the overload;
  reducing transmission speeds for telecommunications network components in the spatial area corresponding to the overload.

3. The method according to claim 1, further comprising:
  detecting excess power being supplied in a spatial area of the power grid by exchanging of information between the central power grid monitoring unit and the telecommunications control unit:
  increasing power consumption by the telecommunications network in the spatial area corresponding to the excess power being supplied through configuration of at least one telecommunications network component in the spatial area corresponding to the excess power being supplied for a time period corresponding to the excess power being supplied;
  wherein increasing the power consumption by the telecommunications network in the spatial area corresponding to the excess power being supplied comprises one or more of the following:
    switching on uninterruptible power supplies (UPSs);
    rerouting communications to go through the spatial area corresponding to the excess power being supplied;
    switching on redundant components of the telecommunications network in the spatial area corresponding to the excess power being supplied;
    increasing transmission speeds for telecommunications network components in the spatial area corresponding to the excess power being supplied;
    activating reactive loads.

4. The method according to claim 1, wherein selection of the configuration of the at least one telecommunications network component is based on a prediction of an overload situation by a forecast module.

5. The method according to claim 4, wherein the prediction of the overload situation provided by the forecast module is for the spatial area corresponding to the overload.

6. The method according to claim 1, wherein the central power grid monitoring unit and/or the telecommunications control unit record operating parameters for both the telecommunications network and the power grid as a function of place x and time t; and
  wherein the detecting is based on the recording.

7. The method according to claim 1, wherein the central power grid monitoring unit records output power and power quality parameter; and
  wherein the detecting is based on the recording.

8. The method according to claim 1, further comprising:
  in case the overload continues to exist in the spatial area corresponding to the overload after decreasing power consumption by the telecommunications network in the spatial area corresponding to the overload, further decreasing power consumption by the telecommunications network in the spatial area corresponding to the overload through further configuration of at least one telecommunications network component.

9. The method according to claim 1, further comprising:
before decreasing power consumption by the telecommunications network in the spatial area corresponding to the overload, checking whether the overload in the spatial area corresponding to the overload can be resolved by the configuration of the at least one telecommunications network component in the spatial area corresponding to the overload.

10. A system for spatiotemporal control of electrical energy consumption of a telecommunications network depending on conditions in a power grid for supplying power to the telecommunications network, the power grid having a central power grid monitoring unit configured to monitor an operating condition of at least one component connected to the power grid, the system comprising:
a telecommunications control unit configured to control at least one telecommunications network component of the telecommunications network;
wherein the telecommunications control unit is further configured to:
detect an overload in a spatial area of the power grid by exchanging information with the central power and monitoring unit; and
decrease power consumption by the telecommunications network in the spatial area corresponding to the overload through configuration of at least one telecommunications network component in the spatial area corresponding to the overload to reroute communications to go around the spatial area corresponding to the overload for a time period corresponding to the overload.

11. The system according to the claim 10, wherein the system is further configured to decrease power consumption by the telecommunications network in the spatial area corresponding to the overload through one or more of the following:
disconnecting telecommunications network components from the power grid and operating the disconnected telecommunications network components through an uninterruptible power supply (UPS);
feeding UPS energy into the power grid;
switching off redundant components of the telecommunications network in the spatial area corresponding to the overload;
reducing transmission speeds for telecommunications network components in the spatial area corresponding to the overload.

12. The system according to the claim 11, wherein the telecommunications control unit is further configured to:
detect excess power being supplied in spatial area of the power grid by exchanging of information with the central power grid monitoring unit: and
increase power consumption by the telecommunications network in the spatial area corresponding to the excess power being supplied through configuration of at least one telecommunications network component in the spatial area corresponding to the excess power being supplied for a time period corresponding to the excess power being supplied;
wherein the telecommunications control unit is configured to increase power consumption by the telecommunications network in the spatial area corresponding to the excess power being supplied through one or more of the following:
switching on uninterruptible power supplies (UPSs);
rerouting communications to go through the spatial area corresponding to the excess power being supplied;
switching on redundant components of the telecommunications network in the spatial area corresponding to the excess power being supplied;
increasing transmission speeds for telecommunications network components in the spatial area corresponding to the excess power being supplied;
activation of reactive loads.

13. The system according to the claim 11, wherein selection of the configuration of the at least one telecommunications network component is based on a prediction of an overload situation by a forecast module.

14. The system according to the claim 13, wherein the prediction of the overload situation provided by the forecast module is for the spatial area corresponding to the overload.

15. The system according to the claim 10, wherein the telecommunications control unit is configured to record operating parameters for both the telecommunications network and the power grid as a function of place x and time t; and
wherein detecting the overload is based on the recorded operating parameters.

16. The system according to the claim 10, wherein the central power grid monitoring unit is configured to record output power and power quality parameters; and
wherein detecting the overload is based on the recorded output power and power quality parameters.

17. The system according to the claim 10, wherein the telecommunications control unit is further configured to:
in case the overload continues to exist in the spatial area corresponding to the overload after decreasing power consumption by the telecommunications network in the spatial area corresponding to the overload, further decrease power consumption by the telecommunications network in the spatial area corresponding to the overload through further configuration of at least one telecommunications network component.

18. The system according to the claim 10, wherein the telecommunications control unit is further configured to:
before decreasing power consumption by the telecommunications network in the spatial area corresponding to the overload, check whether the overload in the spatial area corresponding to the overload can he resolved by the configuration of the at least one telecommunications network component in the spatial area corresponding to the overload.

* * * * *